(12) United States Patent
Sato et al.

(10) Patent No.: US 7,383,976 B2
(45) Date of Patent: Jun. 10, 2008

(54) FRICTION STIR SPOT JOINING DEVICE

(75) Inventors: Yoshio Sato, Ayase (JP); Kenta Aoki, Ayase (JP)

(73) Assignee: Obara Corporation, Ayase-shi, Kanagawa-ken, Tokyo ( * ) Notice: Subject to any disclaimer, the term of this patent is extended or adjusted under 35 U.S.C. 154(b) by 331 days.

(21) Appl. No.: 11/217,724

(22) Filed: Sep. 1, 2005

(65) Prior Publication Data

US 2006/0081679 A1  Apr. 20, 2006

(30) Foreign Application Priority Data

Oct. 14, 2004  (JP) .............................. 2004-299556

(51) Int. Cl.
 B23K 20/12 (2006.01)
 B23K 37/00 (2006.01)
 B23K 31/02 (2006.01)
(52) U.S. Cl. ..................................... 228/2.1; 228/112.1
(58) Field of Classification Search ................. 228/2.1, 228/112.1
 See application file for complete search history.

(56) References Cited

U.S. PATENT DOCUMENTS 5,697,544 A * 12/1997 Wykes ........................ 228/2.1
5,893,507 A    4/1999 Ding et al.
6,199,745 B1   3/2001 Campbell et al.
7,121,451 B2 * 10/2006 Kano et al. ............... 228/112.1
2007/0040007 A1 * 2/2007 Sato ........................ 228/112.1

FOREIGN PATENT DOCUMENTS

JP      2002-178168      6/2002
JP      2002178168 A     6/2002

* cited by examiner

Primary Examiner—Jerry A. Lorengo
Assistant Examiner—Megha Mehta
(74) Attorney, Agent, or Firm—Flynn, Thiel, Boutell & Tanis, P.C.

(57) ABSTRACT

There is provided a friction stir spot joining device in which a pin can be simply and surely caused to come in or come out from a tip end of the joining tool by driving a pin extraction motor. The friction stir spot joining device softens and stirs works to be joined by frictional heat generated by the rotation of a pin so as to perform spot joining and is provided with a stirring motor for rotating a joining tool having a pin, and a pressure application motor for linearly driving the joining tool. The friction stir spot joining device further has a pin extraction motor which is disposed at the rear of a stirring motor on the same axis line as the stirring motor and integrated with the stirring motor.

4 Claims, 2 Drawing Sheets

FRICTION STIR SPOT JOINING DEVICE

FIELD THE INVENTION

The invention relates to a friction stir spot joining device for softening and stirring works to be joined due to frictional heat generated by rotation of a pin so as to perform spot joining, and which is provided with a stirring motor for rotating a joining tool having a pin and a pressure application motor for linearly driving the joining tool, wherein the pin is caused to come in or come out from the tip end of the joining tool.

RELATED ART

There has been conventionally known a friction stir spot joining device for softening and stirring works to be joined due to frictional heat generated by the rotation of a pin so as to perform spot joining and which provided with a stirring motor for rotating a joining tool having a pin and a pressure application motor for linearly driving the joining tool, wherein the pin is caused to come in or come out from the tip end of the joining tool, and wherein a spring is interposed between a rotor serving as the joining tool and a holder which is fixedly secured to the upper end portion of the pin, and the pin is caused to come in or come out from the tip end of the joining tool by the agency of a force of the spring (for example, as disclosed in JP 2002-178168A).

However, the foregoing prior art device has a problem in that although the spring is operated so as to cause the pin to come in or come out from the tip end of the joining tool, a mechanism for operating the spring is very complex, the operating timing thereof is limited and it is difficult to cause the pin to surely come in or come out from the tip end of the joining tool by the agency of a force of the spring.

SUMMARY OF THE INVENTION

The invention has been made in view of the problem of the prior art device, and it is an object of the present invention to provide a friction stir spot joining device employing a motor for extracting a pin (hereinafter referred to as a pin extraction motor) so as to cause the pin to come in or come out from the tip end of the joining tool, wherein the pin can simply and surely come in or come out from the tip end of the joining tool by driving the pin extraction motor.

To achieve the above object, the friction stir spot joining device according to the first aspect of the invention is characterized in including a pin extraction motor which is disposed at the rear of a stirring motor on the same axis line as the stirring motor while integrated therewith.

The friction stir spot joining device according to the second aspect of the invention is characterized in further including a direct action bearing rail disposed inside a driving unit body for housing therein the integrated pin extraction motor and stirring motor and a direct action bearing body fixedly secured to the pin extraction motor retained by the direct action bearing rail.

The friction stir spot joining device according to the third aspect of the invention is characterized in that the pressure application motor is disposed at the rear end of the pin extraction motor on the same axis line as the pin extraction motor, and the pin extraction motor and the stirring motor are moved at the same time when the pressure application motor is driven.

The friction stir spot joining device according to the fourth aspect of the invention is characterized in further including a mechanical component which is disposed between an output shaft side of the stirring motor and a pin holding member for enabling the transmission of the rotating force of the stirring motor and a relative movement in the axial direction between the stirring motor and the pin holding member.

The friction stir spot joining device according to the fifth aspect of the invention is characterized in that an output shaft of the pin extraction motor is rendered hollow.

The friction stir spot joining device according to the sixth aspect of the invention is characterizing in further including a manual operation working section which is provided at the rear end side of the output shaft of a pressure application motor.

According to the friction stir spot joining device of the invention, since the pin extraction motor is disposed at the rear of the stirring motor on the same axis line as the stirring motor, while being integrated therewith, it is possible to realize a friction stir spot joining device wherein the pin can be surely and easily come in or come out from the joining tool arbitrarily at any timing, and a mechanism for operating the pin can be very simplified compared with the conventional device.

Further, in cases where the direct action bearing rail is disposed inside the driving unit body for housing the integrated pin extraction motor and stirring motor, and the direct action bearing body fixedly secured to the pin extraction motor is retained by the direct action bearing rail, it is possible to realize a friction stir spot joining device wherein the pin extraction motor and the stirring motor can be accurately moved in an accompanied state.

Still further, in cases where the pressure application motor is disposed at the rear of the pin extraction motor on the same axis line as the pin extraction motor so as to cause the pin extraction motor and the stirring motor to move at the same time, the pressure application motor, the pin extraction motor, and the stirring motor are formed on the same axis line, so that it is possible to realize a friction stir spot joining device where a driving force from the pressure application motor is simply, accurately and easily transmitted to the pin extraction motor and the stirring motor.

More still further, in cases where a mechanical component such as a spline or sliding key enable the transmission of the rotating force of the stirring motor and the relative movement in the axial direction between the stirring motor and the pin holding member and is disposed between the output shaft side of the stirring motor and the pin holding member, it is possible to realize a friction stir spot joining device wherein the rotating force of the stirring motor is surely transmitted to the pin, and the pin can be moved arbitrarily and accurately in the axial direction by the pin extraction motor relative to the joining tool.

Yet further, in cases where the output shaft of the pin extraction motor is rendered hollow, a part of the power transmission mechanism of the pressure application motor can be inserted in the hollow part of the output shaft of the pin extraction motor, so that it is possible to realize a friction stir spot joining device capable of reducing an entire length thereof.

Yet still further, in cases where the manual operation working section is provided in the rear end side of the output shaft of the pressure application motor, it is possible to realize a safe friction stir spot joining device wherein the pin can be easily extracted from the work to be joined by manually rotating the output shaft of the pressure application motor or a screw shaft from the working section even if any of the motors are broke when the pin is located on the work to be joined.

PREFERRED EMBODIMENT OF THE INVENTION

Figure 1:
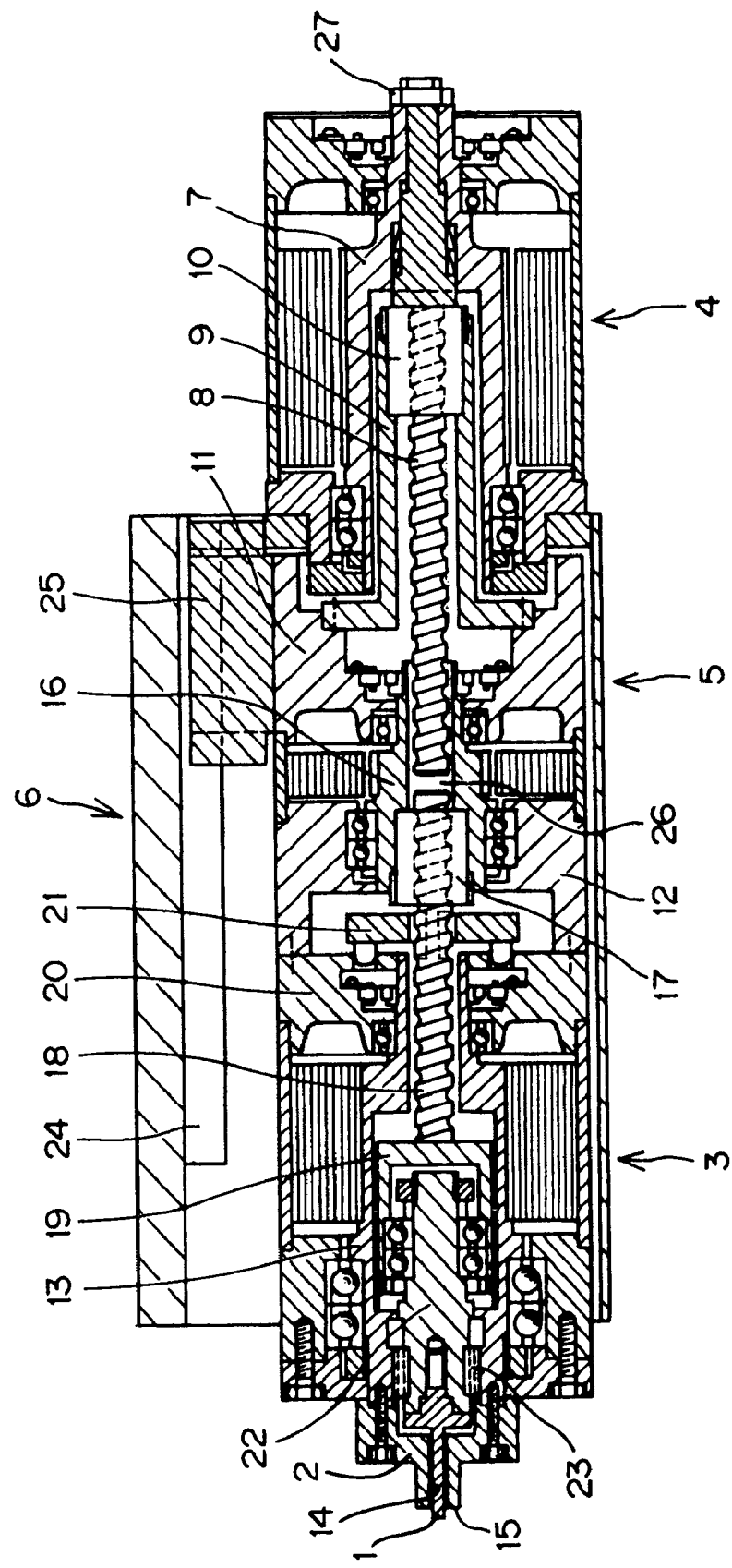
FIG. 1 is a view showing a schematic configuration of a friction stir spot joining device according to an embodiment of the invention.

FIG. 1 is a view showing a schematic configuration of a friction stir spot joining device adapted for working the present invention. The friction stir spot joining device is a device for softening and stirring works to be joined due to frictional heat generated by rotation of a pin 1 so as to perform spot joining. The friction stir spot joining device is provided with a stirring motor 3 for rotating a joining tool 2 having the pin 1 and a pressure application motor 4 for linearly driving the joining tool 2, wherein the pin 1 is caused to come in or come out from the tip end of the joining tool 2, and a pin extraction motor 5 for causing the pin 1 to come in or come out from the tip end of the joining tool 2 is disposed at the rear of the stirring motor 3 on the same axis line as the stirring motor 3 while being integrated therewith.

First Embodiment

Figure 2:
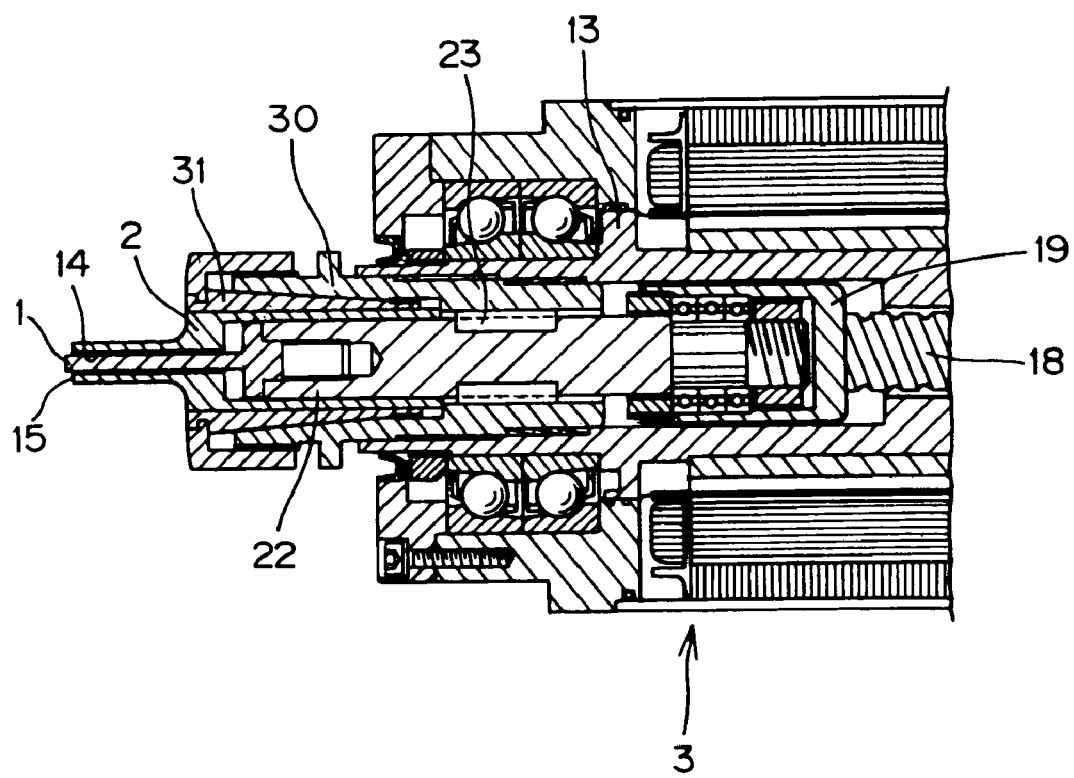
FIG. 2 is a view showing a schematic configuration of a main portion of a friction stir spot joining device according to another embodiment of the invention.

FIGS. 1 and 2

In the friction stir spot joining device, the pin 1 is inserted at a joining point of a work to be joined (not shown), and a part of the work to be joined is softened and stirred owing to a frictional heat caused by the rotation of the pin 1, thereby performing spot joining. The friction stir spot joining device is roughly structured as follows.

A pressure application motor 4 is fixedly secured to a driving unit body 6 which is fitted to a wrist of a robot (not shown), and a screw shaft 8 is fixedly secured to an output shaft 7 of the pressure application motor 4. A pressure application member 9 is provided with a nut 10 threading with a screw of the screw shaft 8 at one end side thereof and fixedly secured to a rear wall 11 of the pin extraction motor 5 at the other end side thereof.

The pin extraction motor 5 and the stirring motor 3 are connected to each other by a front side flange 12 of the pin extraction motor 5, and the pin extraction motor 5 is disposed at the rear of the stirring motor 3 on the same axis line as the stirring motor 3 while integrated therewith.

The joining tool 2 is fitted to the tie end portion of an output shaft 13 of the stirring motor 3, and the pin 1 is inserted in a hole 14 of the joining tool 2 provided at the central axis line, wherein the tip end of the pin 1 is caused to come in or come out from a shoulder section 15 provided at the top end of the joining tool 2 when the pin extraction motor 5 is driven.

A nut 17 is fixedly secured to an output shaft 16 of the pin extraction motor 5, and a bearing case 19 is connected to the tip end of a screw shaft 18 which threads with the nut 17, wherein the screw shaft 18 is not rotated by a rotation stop member 21 which is fixedly secured to a rear wall 20 of the stirring motor 3.

The bearing case 19 is disposed inside the hollow output shaft 13 of the stirring motor 3, and a pin holding member 22 for holding the pin 1 is disposed inside the bearing case 19 via a spline key 23 so as to be freely rotatable together with the output shaft 13. A rear end of the pin 1 is screwed into and fixedly secured to the tip end of the pin holding member 22.

With the friction stir spot joining device having the configuration set forth above, an entire friction stir spot joining device is first moved by a robot to a position confronting a predetermined joining point of the work to be joined.

Here, when the stirring motor 3 and the pressure application motor 4 are driven, the pin extraction motor 5 and the stirring motor 3 advance at the same time toward the joining point of the work to be joined, and the stirring motor 3 and the pin 1 are rotated together by the rotation of the stirring motor 3. At this time, the tip end of the pin 1 is rendered in a state where the tip end of the pin 1 protrudes from the shoulder section 15 of the rotating joining tool 2.

At the time when the shoulder section 15 of the joining tool 2 is brought to intimate contact with the surface of the work to be joined by the pressure application motor 4, the pin 1 is inserted in the work to be joined to be rendered in a rotating state at the joining point, and at this point of time, the advance of the pressure application motor 4 is stopped, while there occurs friction between the pin 1 and the work to be joined owing to the rotation of the pin 1, thereby melting and stirring a part of the work to be joined, and the melted object performs spot joining of the work to be joined.

When the work to be joined is subjected to spot joining, the pin extraction motor 5 is driven so that the pin 1 is extracted from the joining point of the work to be joined and reaches the position which is the same level as the shoulder section 15 of the joining tool 2 or further extracted toward the inside of the hole 14. Since the stirring motor 3 is rotated during the extraction of the pin 1, the shoulder section 15 of the rotating joining tool 2 operates to smooth the surface of the work to be joined at the joining point.

Since the pin 1 is caused to come in or come out arbitrarily relative to the shoulder section 15 of the joining tool 2 by independently driving the pin extraction motor 5 irrespective of the driving of the pressure application motor 4 and the stirring motor 3, the pin extraction motor 5 may be operated, if need be, depending on the conditions of the melted object at the joining point.

In the friction stir spot joining device according to the first embodiment, since the pin extraction motor 5 is disposed at the rear of the stirring motor 3 on the same axis as the stirring motor 3 while integrated with the stirring motor 3, the pin 1 can surely and easily come in or come out from the joining tool 2 arbitrarily at any timing, thereby realizing a friction stir spot joining device which is very simplified in a mechanism for operating the pin compared with a conventional device.

Second Embodiment

In the friction stir spot joining device according to the first embodiment, a direct action bearing rail 24 is disposed inside the driving unit body 6 and a direct action bearing body 25 fixedly secured to the pin extraction motor 5 is retained by the direct action bearing rail 24.

Thus, in cases where the direct action bearing rail 24 is disposed inside the driving unit body 6 and the direct action bearing body 25 fixedly secured to the pin extraction motor 5 is retained by the direct action bearing rail 24, it is possible to realize a friction stir spot joining device wherein the pin extraction motor 5 and the stirring motor 3 can be accurately moved while they are accompanied with each other.

Third Embodiment

In the friction stir spot joining device according to the first embodiment, the pressure application motor 4 is disposed at the rear portion of the pin extraction motor 5 on the same axis line as the pin extraction motor 5, wherein the pin extraction motor 5 and the stirring motor 3 are moved at the same time when the pressure application motor 4 is driven.

Thus, in cases where the pressure application motor 4 is disposed at the rear end portion of the pin extraction motor 5 on the same axis line as the pin extraction motor 5, wherein the pin extraction motor 5 and the stirring motor 3 are moved at the same time when the pressure application motor 4 is driven, the pressure application motor 4, the pin extraction motor 5, and the stirring motor 3 are formed on the same axis line, so that it is possible to realize a friction stir spot joining device wherein the driving force from the pressure application motor 4 is simply, accurately and easily transmitted to the pin extraction motor 5 and the stirring motor 3, and further, the entire configuration of the friction stir spot joining device is rendered slim.

Fourth Embodiment

In the friction stir spot joining device according to the first embodiment, there is provided between the output shaft 13 of the stirring motor 3 and the pin holding member 22 a mechanical component such as the spline key 23 for enabling the transmission of the rotating force and the relative movement in the axial direction between the stirring motor and the pin holding member, or as shown in FIG. 2, a holder 30 of the joining tool 2 is disposed between the output shaft 13 of the stirring motor 3 and the joining tool 2, a mechanical component, such as the spline key 23 enables the transmission of the rotating force and the relative movement in the axial direction is disposed between the holder 30 and the holding member 22.

In FIG. 2, the holder 30 of the joining tool 2 is engaged in the output shaft 13 of the stirring motor 3 by a collet 31, and there is disposed between the holder 30 and the pin holding member 22 a mechanical component such as the spline key 23 enabling the transmission of the rotating force and the relative movement in the axial direction. Other constituent components are substantially the same as those in FIG. 1. they are depicted by the same reference numerals, and the explanation thereof is omitted.

Thus, in cases where there is disposed between the output shaft 13 side of the stirring motor 3 and the pin holding member 22 the mechanical component for enabling the transmission of the rotating force of the stirring motor and the relative movement in the axial direction between the stirring motor 3 and the pin holding member 22, it is possible to realize a friction stir spot joining device wherein the rotating force from the stirring motor 3 to the pin 1 is surely transmitted and also the pin 1 can be moved arbitrarily and accurately in the axial direction by the pin extraction motor 5 toward the joining tool 2.

Fifth Embodiment

In the friction stir spot joining device according to the first embodiment, the output shaft 16 of the pin extraction motor 5 is rendered hollow to form a hollow portion 26, and the tip end side of the screw shaft 8 serving as a part of a power transmission mechanism of the pressure application motor 4 can be inserted in the hollow portion 26.

Thus, in cases where the output shaft 16 of the pin extraction motor 5 is rendered hollow to form a hollow portion 26, the tip end side of the screw shaft 8 serving as a part of a power transmission mechanism of the pressure application motor 4 can be inserted in the hollow portion 26, making it possible to realize a friction stir spot joining device having a reduced length.

Sixth Embodiment

In the friction stir spot joining device according to the third embodiment, a manual operation working section 27 is provided at the rear end side of the output shaft 7 of the pressure application motor 4.

Thus, in cases where the manual operation working section 27 is provided at the rear end side of the output shaft 7 of the pressure application motor 4, it is possible to realize a friction stir spot joining device wherein the pin 1 can be easily extracted from the work to be joined by manually rotating the output shaft 7 of the pressure application motor 4 or the screw shaft 8 from the manual operation working section 27, even if any of the stirring motor 3, the pressure application motor 4 and the pin extraction motor 5 break when the pin 1 is located on the work to be joined.

What is claimed is:

1. A friction stir spot joining device for softening and stirring workpieces to be joined by frictional heat generated by rotation of a pin, comprising: a stirring motor for rotating a joining tool holding the pin; a pressure application motor for linearly driving the joining tool; a pin extraction motor for causing the pin to move axially in and out of a tip end portion of the joining tool and connected to a rear end portion of the stirring motor along a common axis line to be integrated therewith; a driving unit body housing the integrated pin extraction motor and stirring motor and a direct action bearing rail therein; and a direct action bearing body fixedly attached to a side of the pin extraction motor, wherein the stirring motor is retained by the direct action bearing rail and the pressure application motor is disposed at the rear of the pin extraction motor such that the pin extraction motor and the stirring motor are simultaneously moved when the pressure application motor is driven.

2. A friction stir spot joining device according to claim 1, further including a mechanical component disposed between an output shaft side of the stirring motor and a pin holding member for enabling the transmission of the rotating force of the stirring motor and a relative movement in the axial direction between the stirring motor and the pin holding member to be effected.

3. A friction stir spot joining device according to claim 1, wherein an output shaft of the pin extraction motor is rendered hollow.

4. A friction stir spot joining device according to claim 1, further including a manual operation working section provided at a rear end side of an output shaft of the pressure application motor.

* * * * *